United States Patent [19]
DeMeritt et al.

[11] Patent Number: 4,834,494
[45] Date of Patent: May 30, 1989

[54] EXPANDED BEAM WAVEGUIDE CONNECTOR

[75] Inventors: Jeffery A. DeMeritt, Painted Post; Richard A. Long, Corning, both of N.Y.

[73] Assignee: Corning Glass Works, Corning, N.Y.

[21] Appl. No.: 75,573

[22] Filed: Jul. 20, 1987

[51] Int. Cl.⁴ .............................................. G02B 6/38
[52] U.S. Cl. .............................. 350/96.21; 350/96.18
[58] Field of Search .............. 350/96.18, 96.20, 96.21, 350/96.22

[56] References Cited

U.S. PATENT DOCUMENTS

| | | | |
|---|---|---|---|
| 4,420,219 | 12/1983 | Muchel | 350/96.18 |
| 4,421,383 | 12/1983 | Carlsen | 350/96.18 X |
| 4,534,616 | 8/1985 | Bowen et al. | 350/96.18 X |
| 4,607,911 | 8/1986 | Rhodes | 350/96.20 |
| 4,711,518 | 12/1987 | Shank et al. | 350/96.18 X |

Primary Examiner—John D. Lee
Assistant Examiner—Phan T. Heartney
Attorney, Agent, or Firm—Walter S. Zebrowski

[57] ABSTRACT

A field-installable, expanded beam waveguide connector is provided by opposing molded glass bodies having integrally formed therein an aspheric lens with protective ring and conically-shaped fiber alignment depressions. The glass bodies are inserted within at least one sleeve and are operatively associated at one end with their respective fibers, and at the other end to each other.

6 Claims, 3 Drawing Sheets

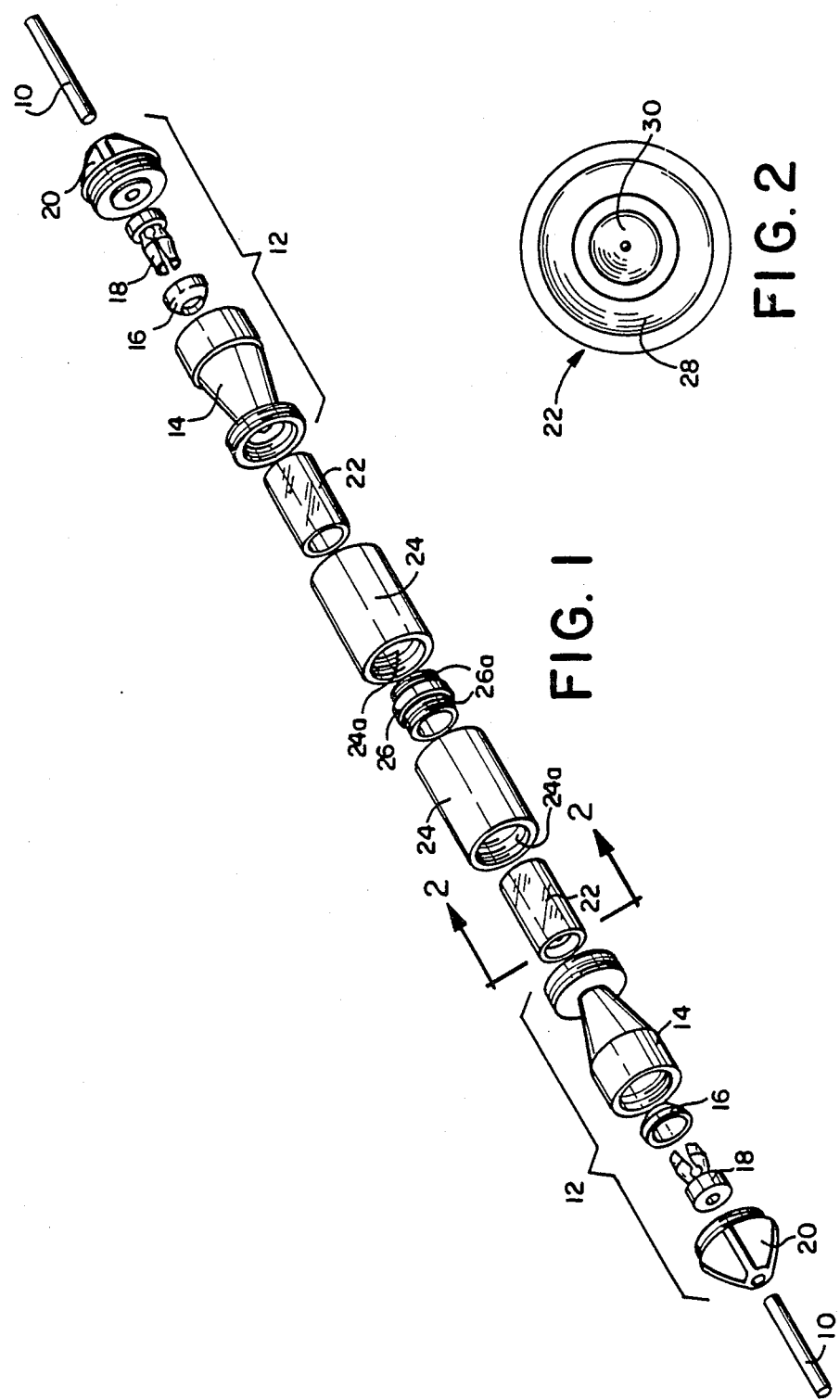

EXPANDED BEAM WAVEGUIDE CONNECTOR

CROSS REFERENCE TO RELATED APPLICATIONS

This application is related in part to U.S. Pat. No. 4,481,023, issued to Marechal and Maschmeyer on Nov. 6, 1984, assigned to the assignee of the present invention, and incorporated herein by reference.

This application is also related to the following co-pending applications, each of which are assigned to the assignee of the present invention, and incorporated herein by reference:

"Kinematically Determinate Mold Assembly", Paul S. Schmitt, Ser. No. 940,120, filed Dec. 10, 1986;

"Balanced Molding of Optical Elements, Paul S. Schmitt, Ser. No. 071,405, filed July 9, 1987 (Attorney's Docket No. CTZ-17/D-9877); and "Deep Pressing Process for Molded Optical Elements", J. A. DeMeritt et al. Ser. No. 075,518, filed July 20, 1987 (Attorney's Docket No. CTZ-11/D-10, 099).

BACKGROUND OF THE INVENTION

This invention relates generally to apparatus utilized to connect optical fibers, and more particularly to such apparatus which include expanded beam terminations.

One of the major problems associated with the connection of optical fibers arises from the need to align their respective cores with great precision. The absolute alignment accuracy necessarily depends not only upon the core diameter and the particular type of fiber, but also upon the maximum permitted joint attenuation. One method of minimizing attenuation utilizes fiber splices, which are permanent joints in the optical fibers somewhat analogous to soldered joints in an electrical system. A number of techniques for joining optical fibers, including fusion splices, V-groove connections, and sleeve splices have been used in the past. Sleeve splices have obvious mechanical advantages for single fiber field splices, but may have the disadvantage of "slop" due to the clearance required to insert the fibers in the sleeve. Fusion splices are also attractive, but they require precise external alignment of the fibers to be joined. V-groove techniques, on the other hand, provide relatively accurate alignment with low attenuation, and are adaptable to connecting multiple pairs of optical fibers. However, connection methods which utilize V-grooves are often unnecessarily complicated by their requirement for complex splicing jigs and associated equipment. It would, therefore, be desirable to provide an optical fiber connector which minimizes attenuation as in the case of fiber splices, but which facilitates installation in the field.

Demountable connections for optical fibers, which are equivalent to electrical plugs and sockets, have also been used to provide such field installability. One prior art demountable optical connector utilizes a butt joint termination of the fibers which are usually protected by a metal or ceramic ferrule accurately locating the fiber ends. In order to terminate an optical fiber in such ferrules, the fiber's coating is removed over a short length from its end, with the fiber being fed into the ferrule filled with a suitable adhesive. The fiber is then polished back flush with the ferrule end. One drawback to the use of butt joint terminations is that they are typically manufactured at the factory in order to reduce the possibilities of introducing contaminants such as moisture and dust, and to permit precise control of geometry.

A second major method of demountable optical connection uses the well-known expanded beam technique for joining fibers. In this approach, the size of the transmitted beam is increased by one half of a connector, the expanded beam being reduced again to a size compatible with the core of the receiving fiber by the second half of the connector. Such expansion can be achieved by using lenses, including glass, plastic, or graded index lenses.

In a demountable connector, an important contribution to the loss is lateral misalignment, since a number of machining tolerances are usually involved. Axial separation of fiber ends also induces a loss which is dependent upon the numerical aperture of the fiber. In a well designed connector or a splice, this separation should be small and its effects minimized through use of an index matching medium. However, while index matching is normally used in a splice, its use in a demountable butt joint connector is a problem owing to the collection of dust and dirt. Angular misalignment of the fiber cores also contributes to connector loss since some of the light incident at the receiving fiber core is not within its acceptance angle. Another contribution to connection loss is Fresnel reflection at the interfaces of the fibers.

In expanded beam terminations, when a prepared fiber end is fixed at the focus of a lens, a collimated beam with a diameter greater than the fiber core diameter emerges from the lens. An optical connector is produced when two such terminatins are aligned. The required connection tolerances are reduced since the increased beam diameter allows greater lateral misalignment of the expanded beam terminations then directly butting fibers. Moreover, owing to the collimation of the beam, a small separation of the terminations can be tolerated without significantly increasing the attenuation. The increased beam diameter also reduces the effect of dust on the connector attenuation since separation of the terminations minimizes the risk of permanent damage arising from grit, scratching, or chipping the optical surfaces when the connector is inadvertently coupled in a dirty condition. These conditions make this an important termination technique for rugged, field installable connectors.

One prior art approach utilizing the expanded beam technique is described in U.S. Pat. No. 4,421,383—Carlsen. Light from an optical fiber is coupled to an integral optical-quality plastic connector body having an annular planar reference surface substantially perpendicular to the optical axis. A convex lens surface is molded, recessed inward from the reference surface, while the opposite axial end of the body has a central cylindrical cavity within which the fiber is held one focal length from the lens surface by a molded elastomeric fiber holder. Two such expanded beam terminations are held together by a slightly elastic cylindrical tube having a shaped lip which snap fits over raised rings formed about the outer surface of the connector bodies.

One drawback to the above claimed invention is that it incorporates only spherical, convex lens surfaces. That is, the convex lens used in the connector of U.S. Pat. No. 4,421,383 is generally incapable of reducing aberrations as in the case of aspheric lens surfaces which are altered slightly from the typical spherical surface encountered in such convex lenses. Such aspheric surfaces, especially when integrated within molded bodies such as that disclosed in U.S. Pat. No. 4,421,383, are often difficult to produce and generally cost-ineffective. Furthermore, plastics suitable for optical applications are available in a limited refractive index and dispersion range only. Many plastics scratch easily and are prone to the development of yellowing, haze, and birefringence. The use of abrasion-resistant and anti-reflective coatings, as disclosed in U.S. Pat. No. 4,421,383, has not fully solved those failings. Moreover, plastic optical elements are subject to distortion from mechanical forces, humidity, and heat. Both the volume and refractive index of plastics vary substantially with changes in temperature, thereby limiting the temperature interval over which they are useful.

The overall properties of glass render it generally superior to plastic as an optical material. Glass is a much better substrate for the application of multi-layer anti-reflection coatings because it is chemically inert, dimensionally stable, and can be coated at elevated temperatures. As described above, glass also has excellent performance over a broad range of temperature, humidity, and other environmental conditions. This performance is due to its low coefficient of thermal expansion, its essential imperviousness to water absorption, its high resistance to other environmental attacks (e.g., salt spray, fungus, and acids), and its resistance to other atmospheric contaminants. Additionally, glass has a very high mechanical strength, allowing precision optical elements formed of glass to perform without optical degradation, or mechanical deformation while under stress.

Precision optical elements of glass are customarily produced via one of two complex, multi-step processes. In the first, a glass batch is melted in a conventional manner and the melt formed into a glass body having a controlled and homogenous refractive index. Thereafter, the body may be reformed utilizing well-known repressing techniques to yield a shape approximating the desired final article. The surface figure and finish of body at this stage of production, however, are not adequate for image forming optics. As a result, the rough article is fine annealed to develop the proper refractive index, while the surface figure is improved via conventional grinding practices. In the second method, the glass melt is formed into a bulk body which is immediately fine annealed and substantially cut and ground to articles of a desired configuration.

Both processes are subject to similar limitations. The surface profiles that are produced through grinding are normally restricted to conic sections, such as flats, spheres, and parabolas. Other shapes and, in particular general aspheric surfaces are difficult to grind. In both processes, the ground optical surfaces are polished employing conventional, but complicated, polishing techniques which strive to improve surface finish without comprising the surface figure. In the case of aspheric surfaces, this polishing demands highly skilled and expensive hand working. A final finishing operation, viz., edging, is commonly required. Edging insures that the optical and mechanical axes of a spherical lens coincide. However, edging does not improve the relationship of misaligned aspheric surfaces, which factor accounts in part for the difficulty experienced in grinding such lenses. It would, therefore, be desirable to design an expanded beam waveguide connector which employs aspherical lenses to reduce aberrations, the lens being manufactured of optical quality glass rather than plastic, and being produced through direct molding to its finished state, thus eliminating the grinding, polishing, and edging operations which are especially difficult and time consuming for aspherical lenses.

One such prior art approach utilizing aspheric lenses to connect expanded beam terminations includes a molded glass aspheric element having active imaging surfaces and percision flats on both the front and rear. The flat adjacent to the aspheric surface serves as a reference surface such that, when opposing lenses are mounted within the connector element having precision stainless steel ball spacers between them, they are true to each other to within about 15 seconds of arc. Compression rings mounted behind the lenses provide elastic opposing forces needed to keep the lenses in positive contact with the ball spacers.

Since the contact length of the lens cell diameter within its housing is very small, it provides the lens with the freedom to align angularly while controlling lateral displacement. Lateral displacement is also provided by a cell molded around the lens. In order to connect the lens cell with its respective optical fiber, the fiber is inserted within and secured to a ferrule with the fiber/ferrule assembly being correctly positioned on the lens through use of a complex fiber positioning advice comprised of a quad cell detector, preamp, feedback electronics and motor drive.

Due to the relatively simple configuration of the lens element, a connector manufactured in accordance with the above described approach may be accomplished through molding. However, the manufacturing of such elements requires a two-step process of molding the lens followed by molding the lens cell thereafter. Furthermore, the glass composition utilized in such applications necessitates production temperatures in excess of 500° C., and is substantially incapable of being molded into complex and concave surfaces. Other drawbacks, such as the relative complexity of the equipment required to position the fiber relative to the optical axis of the aspheric lens, and the precision machining necessitated by the compression ring and ball spacers, also complicate the production of such prior art devices. It would, therefore, be desirable to provide a precision optical element for use in expanded beam waveguide connectors which is easy and cost-effective to fabricate, and readily installed in the field.

SUMMARY OF THE INVENTION

In accordance with the present invention, a precision optical element for use in expanded beam waveguide connectors is comprised of a molded body of optical quality glass, the body including first and second concentric conical depressions at one end thereof to accurately position the fiber relative to the focal plane and optical axis of an aspheric lens formed in the opposite end of the body. The lens body further includes an annular reference surface formed about and extending outward from the aspheric lens.

A pair of such lens bodies are advantageously employed within an expanded beam waveguide connector assembly in accordance with the present invention. In a first embodiment, each lens is first placed within respective generally cylindrical alignment sleeves having interior threaded portions formed at each end. A connector element of predetermined length having external threads formed at each end is used to connect the respective alignment sleeves containing the lens bodies. Thereafter, cable retaining means having external threads formed at one end thereof is used to couple the optical fibers to the lenses via their alignment sleeves. In accordance with a second and presently preferred embodiment of the invention, the annular reference surface extends outward from the aspheric lens a predetermined distance which eliminates the necessity of the spacer. As such, the lens bodies abut one another within a single alignment sleeve connected to the cable retaining means. The expanded beam waveguide connector in accordance with the present invention thus makes it possible to quickly and accurately connect optical fibers in the field without the necessity for complex fiber positioning apparatus or polishing of the fiber ends.

The foregoing and other objects, features and advantages of the present invention will be better understood from the following more detailed description when considered in conjunction with the accompanying drawings wherein:

BRIEF DESCRIPTION OF THE DRAWINGS

FIG. 1 is an exploded perspective view of an expanded beam waveguide connector in accordance with a first embodiment of the present invention;

FIG. 2 is an end view of the lens body shown in FIG. 1 taken along the lines 2—2;

DESCRIPTION OF THE PREFERRED EMBODIMENTS

Figure 3:
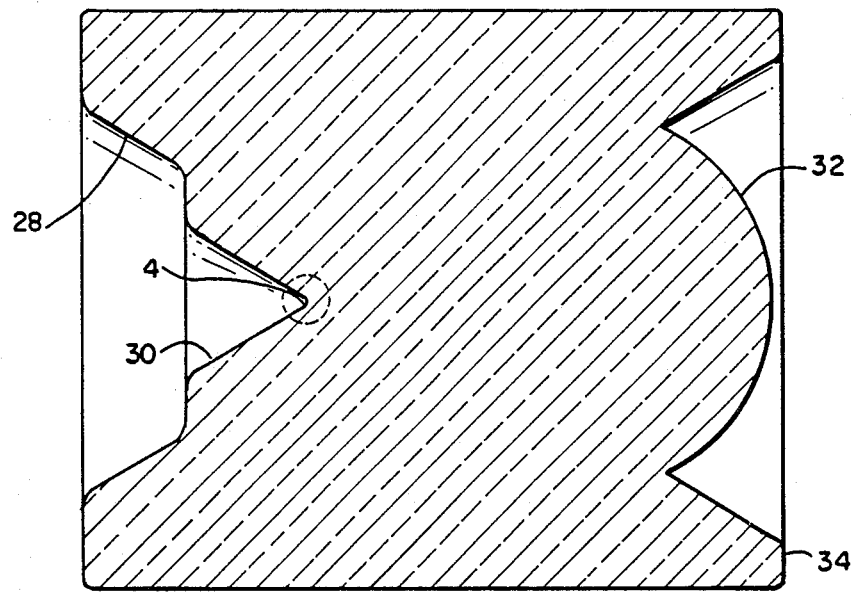
FIG. 3 is a cross-sectional view of the lens body shown in FIG. 1.

Referring now to the drawings, wherein like characters designate like or corresponding parts throughout the several views, there is shown in FIG. 1 and exploded view of an expanded beam waveguide connector in accordance with a first embodiment of the present invention. The ends of a pair of optical fibers 10 are retained within cable retaining means 12 comprised generally of a cable retainer body 14, a retainer ring 16, a cable retainer 18, and a retainer cap 20. By inserting the fiber 10 first through a hole formed central in the retainer cap 20, and thereafter sliding the cable retainer 18 over the end of the fiber 10, the retainer ring 16 can be placed over the flexible fingers extending from the cable retainer 18 such that the retainer ring 16 when placed within the bore of the cable retainer body 14 will wedge the fingers tightly against the fiber 10 when the retainer cap 20 is threaded into the cable retainer body 14.

Figure 4:
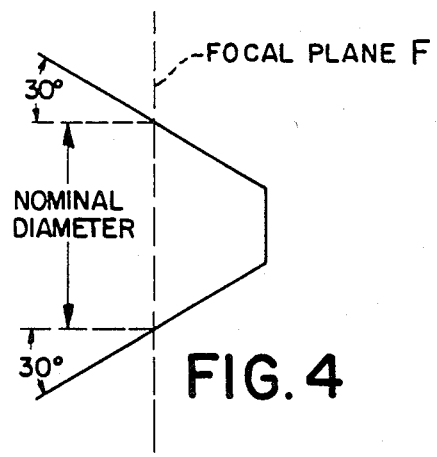
FIG. 4 is a detailed view of the conical depression shown in FIG. 3.

A precision optical element 22, as described in greater detail with reference to FIGS. 2-4, is inserted within an alignment sleeve 24, generally cylindrical in shape and having threaded portions 24a formed in its interior surface at each end. A pair of such alignment sleeves 24 are connected together by an adaptor 26 having a predetermined length designed to optimally couple the light passing from one fiber 10 to the other through their respective elements 22. Adaptor 26 has formed at its ends exterior threads 26a which match the threads 24a of each alignment sleeve 24. Thereafter, as described herein above, the fibers 10 contained within respective cable retainer means 12 are attached to the alignment sleeves 24, such as by threading their cable retainer bodies 14 to respective alignment sleeves 24, thereby completing the connection. The cable retainer means 12, alignment sleeves 24 and adaptor 26 may be formed of any suitable plastic, such as, for example, Torlon, Ultem, Delrin and the like.

Referring now to FIGS. 2-4, details of the precision optical element 22 will be described. Each element 22 consists generally of a substantially cylindrical body molded of optical quality glass. Compositions suitable for such glass are disclosed and claimed in U.S. Pat. Nos. 4,362,819—Olszewski et al, and 4,447,550—Leroy et al, both of which are assigned to the assignee of the present invention, and incorporated herein by reference. The advantages of such compositions are generally exhibited in their ability to be molded into complex shapes of a highly precise nature at temperatures not exceeding 500° C. While the moldable fluoroaluminophosphate glasses taught by Olszewski et al and the moldable lead aluminoborofluorosilicate glasses taught by Leroy et al are generally applicable for use in accordance with the present invention, one presently preferred glass composition is comprised of 39.0% $P_2O_5$, 5.0% $Na_2O$, 4.7% F, 24.0% PbO, 20.0% $B_2O$, 1.9% $Li_2O$, and 5.4% $Al_2O_3$ (weight percent on an analysis basis). Methods of molding which utilize such compositions are disclosed and claimed in U.S. Pat. No. 4,481,023—Marechal et al, and in the following copending U.S. patent applications, each of which are assigned to the assignee of the present invention, and incorporated herein by reference:

"Kinematically Determinate Mold Assembly", Paul S. Schmitt, Ser. No. 940,120 filed Dec. 10, 1986;

"Balanced Molding of Optical Elements", Paul S. Schmitt, Ser. No. 071,405 filed July 9, 1987 (Attorney's Docket No. CTZ-17/D-9877); and "Deep Pressing Process of Molded Optical Elements", J. A. DeMeritt et al. Ser. No. 071,518 filed July 20, 1987 (Attorney's Docket No. CTZ-11/D-1099).

Element 22, preferably molded in accordance with the above referenced application, "Deep Pressing Process for Molded Optical Elements", J. A. DeMeritt et al. Ser. No. 071,518, filed July 20, 1987 (Attorney's Docket No. CTZ-11/D-10,099), includes a pair of concentric conical depressings 28 and 30. The first conical depression 28 is formed to contain a similarly formed torus-shaped or conical extension of the cable retainer body 14 in order to minimize angular misalignment of fiber 10 contained within the cable retainer means 12. The second conical depression 30, as shown in greater detail in FIG. 4, is formed to contain the fiber 10 within 4.0 microns axially of the focal plane F and between zero and 0.2 microns laterally of the optical axis of an aspherical lens surface 32 formed at the opposite end of the element 22 for optical fibers 10 of the single mode variety, and between zero and 0.4 microns laterally for multi-mode optical fibers 10. The shape of the second conical depression 30, thus, ensures that any fiber 10 within three standard deviations of a predetermined nominal size will fall within such axial displacement of the focal plane F. For example, as shown in greater detail in FIG. 4, the second conical depression 30 is formed by a thirty degree angle of revolution which places a 0.125 millimeter nominal diameter fiber 10 at the focal plane F, while still permitting fibers within three standard deviations of the nominal diameter (i.e., 0.1231–0.1277 millimeter) to be axially aligned within 4.0 microns of the focal plane F. That relationship, in conjunction with the concentricity of the molded depressions 28 and 30, also ensures lateral alignment within zero and 0.2 or 0.4 microns, respectively, for single and multi-mode fibers 10. Conventional index matching fluids may be utilized within the depression 30 before insertion of the fiber 10 in order to ensure maximum throughput of light. Also, preferably fiber 10 may extend from retainer means 12 a distance such that when retainer means 12 is connected or threaded to alignment sleeve 24, the distal end of the fiber is in pressure contact with the walls of conical depression 30. Such pressure contact may introduce slight bending to the fiber. In this manner the fiber is assured of being operatively associated with optical element 22.

Formed about the aspherical lens surface 32 and extending outwardly therefrom, an annular surface 34 protects the optical surface of the lens 32 and defines a stable reference plane for lens-to-lens alignment. Once placed within its respective alignment sleeve 24, proper lens-to-lens spacing is achieved through adaptor 26 having a preselected length. An expanded beam waveguide connector in accordance with the present invention may be easily assembled in the field by merely screwing its individual elements together, inserting the lens 22 within the assembled alignment sleeves 24, placing an index matching fluid in the conical depression 30, and screwing the cable retainer means 12 with its respective optical fiber 10 into the opposite end of the alignment sleeve 24. Accurate placement of the fiber 10 relative to its respective aspheric lens surface 32 is achieved through the cooperation of the conical depression 28 with the torus-shaped extension of the cable retainer body 14, and of the conical depression 30 with the tip of the fiber 10.

Figure 5:
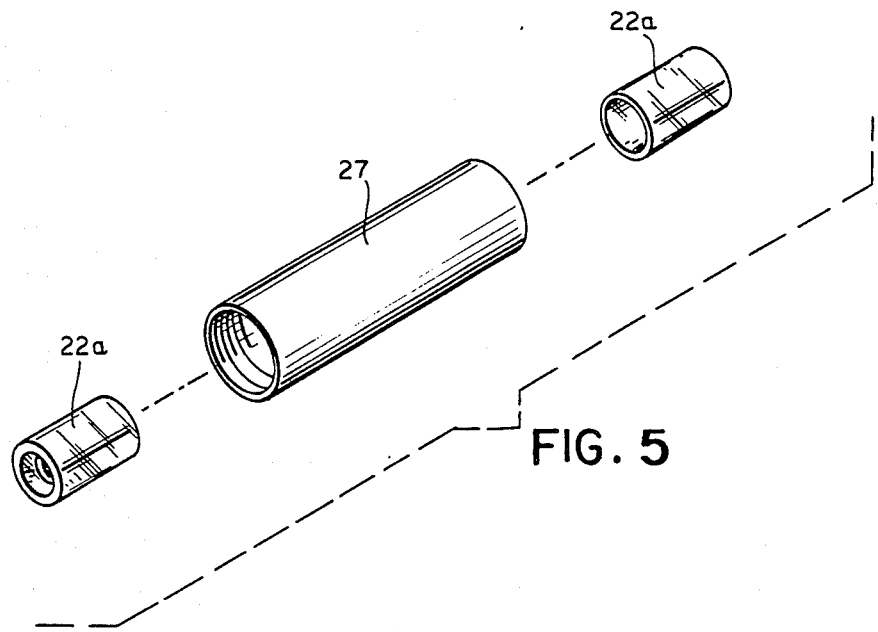
FIG. 5 is an exploded perspective view of a portion of an expanded beam waveguide connector in accordance with a second embodiment of the present invention.
Figure 6:
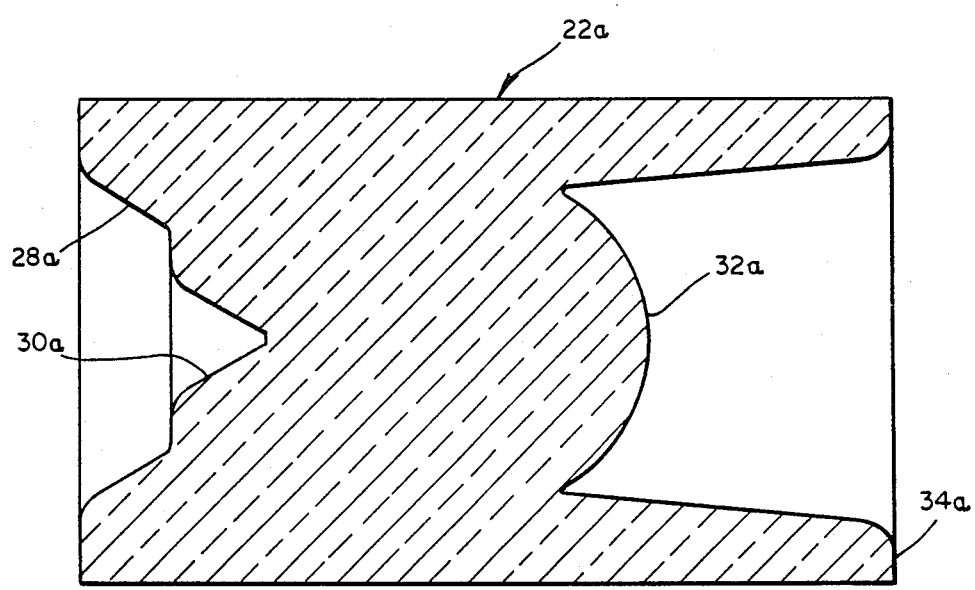
FIG. 6 is a cross-sectional view of the lens body shown in FIG. 5.

Referring now to FIGS. 5 and 6, a second and presently preferred embodiment of the invention is shown. Like the first embodiment shown in FIGS. 1-4, the connector according to this second embodiment includes cable retaining means 12 comprised generally of a cable retainer body 14, a retainer ring 16, a cable retainer 18, and a retainer cap 20 for retaining the ends of a pair of optical fibers 10. The pair of alignment sleeves 24 connected together by the adaptor 26 having a predetermined length designed to optimally transmit the light passing from one fiber 10 to the other, however, is replaced by a single alignment sleeve 27 containing a pair of precision optical elements 22a as shown in FIG. 6.

The element 22a, as is the case of element 22, is preferably molded in accordance with the above referenced application, "Deep Pressing Process for Molded Optical Elements", J. A. DeMeritt et al, Ser. No. 071,518 filed July 20, 1987 (Attorney's Docket No. CTZ-11/D-10,099), and includes a pair of conical depressions 28a and 30a for maintaining axial alignment of the fiber 10 within 4.0 microns of the focal plane F and lateral alignment of between zero and 0.2 or 0.4 microns, respectively, for single mode and multi-mode fibers 10 relative to the optical axis of an aspheric lens surface 32a. By carefully sizing the length of the integral ring formed between the aspheric lens surface 32a and an annular surface 34a, however, the pair of alignment sleeves 24 and adaptor 26 may be replaced by a single alignment sleeve 27 as shown in FIG. 5. That is, the integral ring not only protects the optical surface of the lens 32a and defines a stable reference plane for lens-to-lens alignment, but also separates the aspheric lens surfaces 32a of two such elements 22a by a predetermined distance required for optimum coupling efficiency.

Although particular embodiments of the invention have been shown and described and various modifications suggested, it will be appreciated that other embodiments and modifications which fall within the true spirit and scope of the invention as set forth in the appended claims will occur to those of ordinary skill in the art.

What is claimed is:

1. A connector for coupling light between the distal ends of a pair of optical fibers, each having a nominal diameter, comprising:

a first molded glass body of substantially cylindrical shape, said body having formed therein at one end thereof an aspheric lens with a protective annular ring extending outwardly therefrom, said lens defining an optical axis and a focal plane, and conical alignment means formed at the other end for positioning the distal end of one of the fibers axially with respect to said focal plane an optical distance from said lens and radially with respect to said optical axis for efficient light transfer;

first sleeve means for containing said first glass body, said first sleeve means including threaded portions formed at both ends;

first cable retaining means attached to the cable containing the fiber positioned within said first body for holding the distal end of the fiber at said optimal distance, said first retaining means including a threaded portion formed to be attached with one threaded portion of said first sleeve means;

a second molded glass body of substantially cylindrical shape, said body having formed therein at one end thereof an aspheric lens with a protective annular ring extending outwardly therefrom, said lens defining another focal plane along said optical axis, and conical alignment means formed at the other end for positioning the distal end of the other fiber axially with respect to said focal plane said optimal distance and radially with respect to said optical axis;

second sleeve means for containing said second glass body, said second sleeve means including threaded portions formed at both ends;

second cable retaining means attached to cable containing the fiber positioned within said second body for holding the distal end of the fiber at said optimal distance, said second retaining means including a threaded portion formed to be attached with one threaded portion of said second sleeve means; and an adaptor of predetermined length having threaded portions formed at both ends thereof and adapted to join said first and second sleeve means thereby opposing the lenses of said first and second bodies for maximum light throughput.

2. A connector for coupling a pair of optical fibers, comprising a first molded glass body of substantially cylindrical shape having formed therein at one end thereof a first aspheric lens defining a first optical axis and a first focal plane, and conical alignment means formed at the other end thereof for aligning one of said fibers axially with respect to said first focal plane and radially with respect to said first optical axis, first retaining means operatively associated with said one of said fibers, a second molded glass body of substantially cylindrical shape having formed therein at one end thereof a second aspheric lens defining a second optical axis and a second focal plane, and conical alignment means formed at the other end thereof for aligning the other of said fibers axially with respect to said second focal plane and radially with respect to said second optical axis, second retaining means operatively associated with the other of said fibers, a first sleeve for containing said first molded glass body, second sleeve for containing said second molded glass body, and an adaptor adapted to connect said first and second sleeves in a manner such that said first and second aspheric lenses of said first and second molded glass bodies respectively are in opposing relationship, said first and second molded glass bodies being disposed respectively within said first and second sleeves in a manner such that said first and second optical axes are substantially coextensive, said first sleeve including means at one end therefor for attaching said first retaining means thereto, said second sleeve including means at one end thereof for attaching said second retaining means thereto, said first retaining means having attaching means at one end thereof for attachment to one end of said first sleeve, said second retaining means having attaching means at one end thereof for attachment to one end of said second sleeve.

3. The connector for coupling a pair of optical fibers of claim 2 further comprising a first retainer body defining a first conical bore extending therethrough, a first ring adapted to be inserted into said first conical bore, first clamping means defining a first cylindrical bore extending therethrough and including a pair of flexible fingers extending outwardly therefrom, said first cylindrical bore being adapted to receive said one of said fibers, said first clamping means and said first ring being operatively associated with said first conical bore, a first retainer cap operatively associated with said first retainer body to press said first clamping means within said first conical bore, a second retainer body defining a second conical bore extending therethrough, a second ring adapted to be inserted into said second conical bore, second clamping means defining a second cylindrical bore extending therethrough and including a pair of flexible fingers extending outwardly therefrom, said second cylindrical bore being adapted to receive said other of said fibers, said second clamping means and said second ring being operatively associated with said second conical bore, and a second retainer cap operatively associated with said second retainer body to press said second clamping means within said second conical bore.

4. The connector for coupling a pair of optical fibers of claim 3 further comprising a first protective annular ring disposed about said first aspheric lens and outwardly extending therefrom, said first protective annular ring being an integral portion of said first molded glass body, and a second protective annular ring disposed about said second aspheric lens and outwardly extending therefrom, said second protective annular ring being an integral portion of said second molded glass body.

5. The connector for coupling a pair of optical fibers of claim 4 wherein each said means for attaching are threads and said adaptor is connected to said first and second sleeves by threads.

6. The connector for coupling a pair of optical fibers of claim 2 further comprising a first protective annular ring disposed about said first aspheric lens and outwardly extending therefrom, said first protective annular ring being an integral portion of said first molded glass body, and a second protective annular ring disposed about said second aspheric lens and outwardly extending therefrom, said second protective annular ring being an integral portion of said second molded glass body.

* * * * *